Sept. 23, 1947. A. LATHAM, JR 2,427,730
BEARING
Original Filed Jan. 15, 1944 5 Sheets-Sheet 1

Fig. 1.

INVENTOR
Allen Latham Jr
BY Kenyon & Kenyon
ATTORNEYS

Sept. 23, 1947. A. LATHAM, JR 2,427,730
BEARING
Original Filed Jan. 15, 1944 5 Sheets-Sheet 5

Patented Sept. 23, 1947

2,427,730

UNITED STATES PATENT OFFICE 2,427,730

BEARING

Allen Latham, Jr., Jamaica Plain, Mass., assignor to Arthur D. Little, Inc., Cambridge, Mass., a corporation of Massachusetts Original application January 15, 1944, Serial No. 518,357. Divided and this application December 13, 1944, Serial No. 567,958

11 Claims. (Cl. 308—238)

This invention relates to bearings and more particularly to the materials that are used for the bearing surfaces presented by two relatively movable members of a lubricated bearing.

This application is a division of my application Serial No. 518,357, filed January 15, 1944, for Compressor-motor.

It is a purpose of this invention to provide bearing means which is adapted for operation using water or similar liquid as a lubricant. It is a particular object and purpose of this invention to provide novel bearing means adapted for use in rotary compressor-motor apparatus, the bearing means being flooded with water adjacent its boiling point or similar liquid to provide lubricant.

In the operation of compressor-motor apparatus of the character aforesaid using water or the like as a lubricant, it has been found that ordinary bearing metals are inadequate to withstand the severe conditions imposed upon the bearing. According to the present invention bearings have been afforded which under test have withstood the severe conditions imposed for long periods of service.

According to this invention, a bearing that comprises two relatively movable members and means for supplying water or the like as the lubricant to the bearing surfaces between the bearing members, is constructed using a novel combination of bearing surface materials. The bearing surface presented by one of the bearing members has as a base a synthetic resin that is highly resistant to boiling water and that is selected from the group consisting of phenol aldehyde and melamine resins and contains mineral fiber and a solid lubricant. The bearing surface presented by the other bearing member consists of a metal having a Brinell hardness of at least 200 and has high resistance to corrosion in contact with water at its boiling point.

Other features of this invention relate to certain preferred bearing materials which are used in combination and to the disposition of such bearings in compressor-motor apparatus and in combination with means for supplying and heating water to the bearing surfaces.

For the purpose of exemplification, the novel bearing means and means for supplying water thereto as lubricant are shown in the accompanying drawing, wherein.

In the following description of the drawings, the apparatus is arranged for purposes of illustration as appropriate for use as a compressor operable for compressing water vapor and, for the sake of brevity, the apparatus shown in the drawings will be referred to as a compressor.

The compressor is shown secured to a suitable support 10, which may, for example, be the end of a crank case of an engine having the power shaft 11 rotatably mounted in the bearing 75. The back cover plate 12 of the compressor is secured to the support 10 by any suitable means such as the bolts 13.

Figure 11:
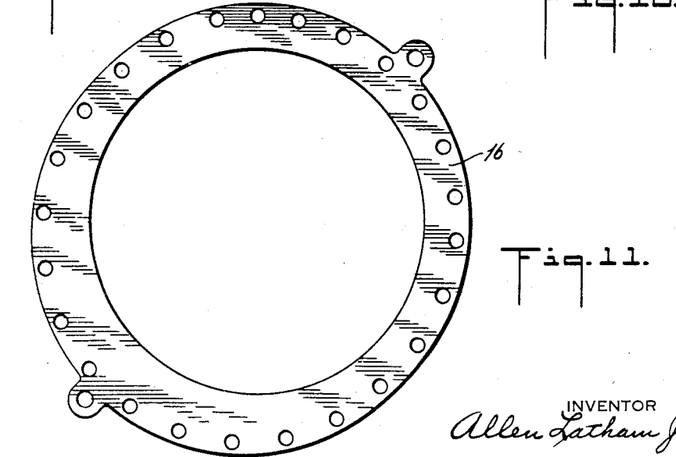
Fig. 11 is a front elevation, on a reduced scale, of one of the seal plates forming part of a sealing means of the apparatus.

The port ring 14 is secured to the back plate 12 by the bolts 15 with the seal plate 16 assembled therebetween. The port ring 14 presents an internally cylindrical surface, and has an inlet port 18 and an outlet port 19 therein. Secured to the other side of the port ring 14 by bolts 20 is the front cover plate 21, with the seal plate 16' assembled therebetween. The port ring, together with the seal plates 16 and 16' provide confining means presenting an internally cylindrical surface, this confining means cooperating with the periphery of the rotor to provide a crescent shaped chamber for the compression of vapor as will be described below. While the confining means has been shown as composed of a specific arrangement of parts, it is apparent that the confining means can be constructed in other ways. The seal plates 16 and 16' are identical, and one of them, namely, the seal plate 16, is shown separately, but on a reduced scale, in Fig. 11. It may be noted that the outer and inner edges are not concentric, the outer edge corresponding to that of the port ring while the inner curvature corresponds to that of the rotor, the axis of which is offset from that of the inner cylindrical surface of the port ring.

Within the port ring is the rotor which is indicated generally by the reference character 22. The rotor has an end wall 23 which is secured to the hub 24 of power shaft 11 by bolts 25, the heads of which are countersunk in the recesses 71 in the end wall 23. A steam seal packing means 26 is provided between the exterior of the rotor end wall 23 and the back plate 12 and the support 10, and a packing 72 may be provided when, for example, the power shaft 11 is the crank shaft of an internal combustion engine and it is desired to provide a seal against leakage of oil from the crank case. Extending from the end wall 23 are three rotor segments 27 which collectively present a peripheral cylindrical surface. Secured to the ends of rotor segments 27 by bolts 28 is the ring-shaped rotor end wall 29, which in turn has secured thereto by bolts 30 the rotor journal 31. The rotor bushing 32 is interposed between the rotor journal 31 and the journal housing 33 which is part of the front cover plate 21.

Figure 3:
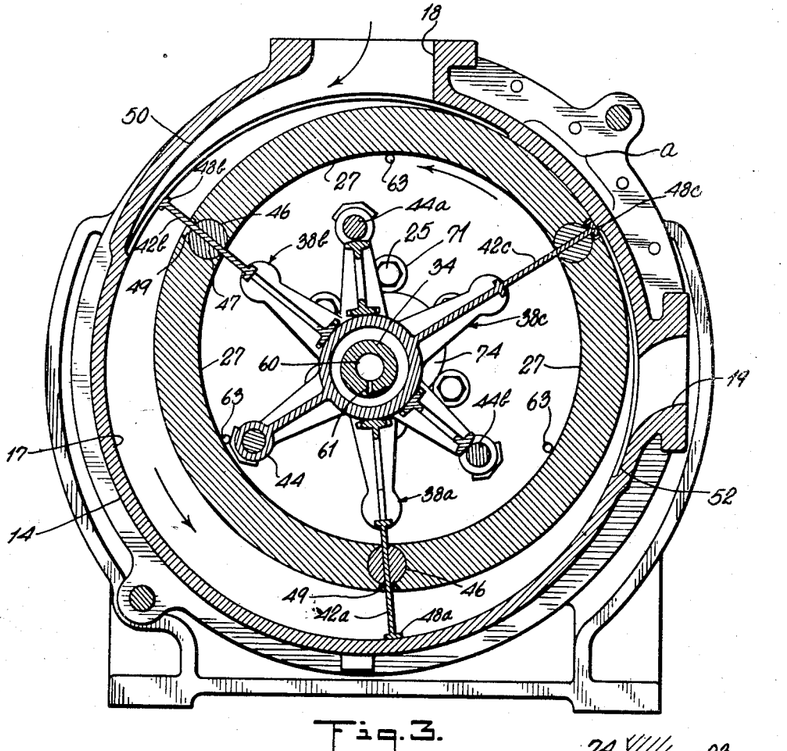
Fig. 3 is a front sectional elevation of the compressor-motor apparatus taken on the line 3—3 of Fig. 2.
Figure 4:
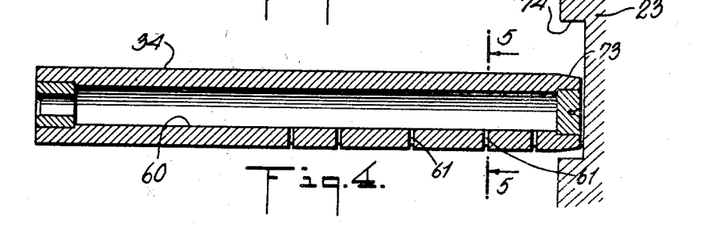
Fig. 4 is a side sectional elevation on an enlarged scale of the shaft means for carrying the vane units showing the channels therein for lubricant.
Figure 5:
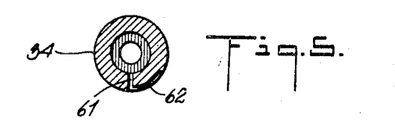
Fig. 5 is a cross-section of the shaft means shown in Fig. 4 and taken on the line 5—5 of Fig. 4.

The axis of rotation of the rotor 22 as determined by the shaft 11 on one side of the rotor and the rotor journal 31 on the other side of the rotor is parallel to, but offset from the axis of the internal cylindrical surface of the port ring that constitutes part of the confining means above referred to. The dimensions of the parts are such that the rotor comes into close proximity to the region of the port ring indicated by the reference character $a$ in Fig. 3 with a very small clearance therebetween. Preferably, the curvature of the region of the port ring indicated as $a$ conforms to the curvature of the cylindrical periphery of the rotor rather than the curvature of the inner cylindrical surface of the balance of the port ring so as to provide a region of substantial length that affords a seal between the inlet and outlet ports of the seal ring rather than merely a line of sealing abutment between the periphery of the rotor and the inner surface of the port ring. The balance of the periphery of the rotor is spaced from the inner surface of the port ring leaving a crescent-shaped chamber therebetween. The inner surface of the port ring is characterized by the internal cylindrical surface 17, and the port ring and confining means are referred to herein as presenting an internal cylindrical surface notwithstanding the occurrence therein of the inlet and outlet ports and the possible occurrence of a region such as the region $a$ where the curvature does not conform to the balance of internal cylindrical surface. When reference is made to the axis of the internal cylindrical surface of the port ring or of the confining means, the reference is to the axis of the cylindrical surface 17.

Coincident with the axis of the internal cylindrical surface of the port ring is the vane-carrying shaft 34. This shaft is fixedly supported by the shaft hub 35 which is secured to the end of journal housing 33 by bolts 36. The shaft 34 can be kept from rotating relative to the hub 35 by the set screw 37 and preferably is provided with a tapered end portion 73 that extends into the counter-sunk recess 74 in the center of the end wall 23.

Figure 1:
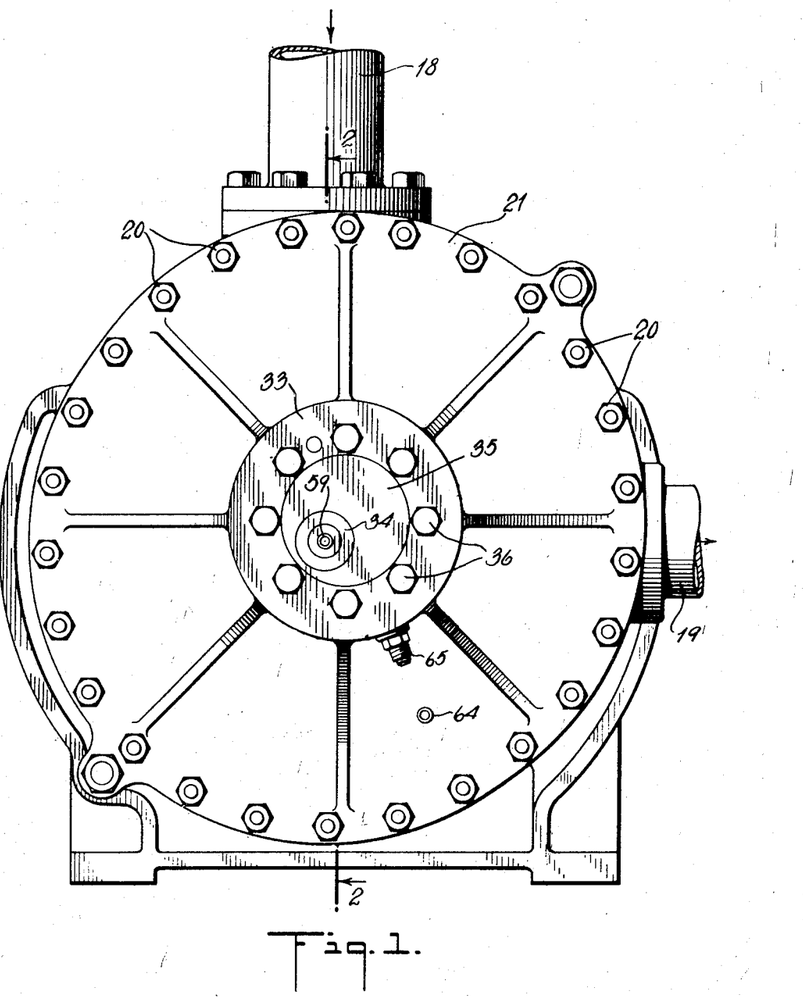
Fig. 1 is a front elevation of compressor-motor apparatus embodying the bearing means of this invention.
Figure 2:
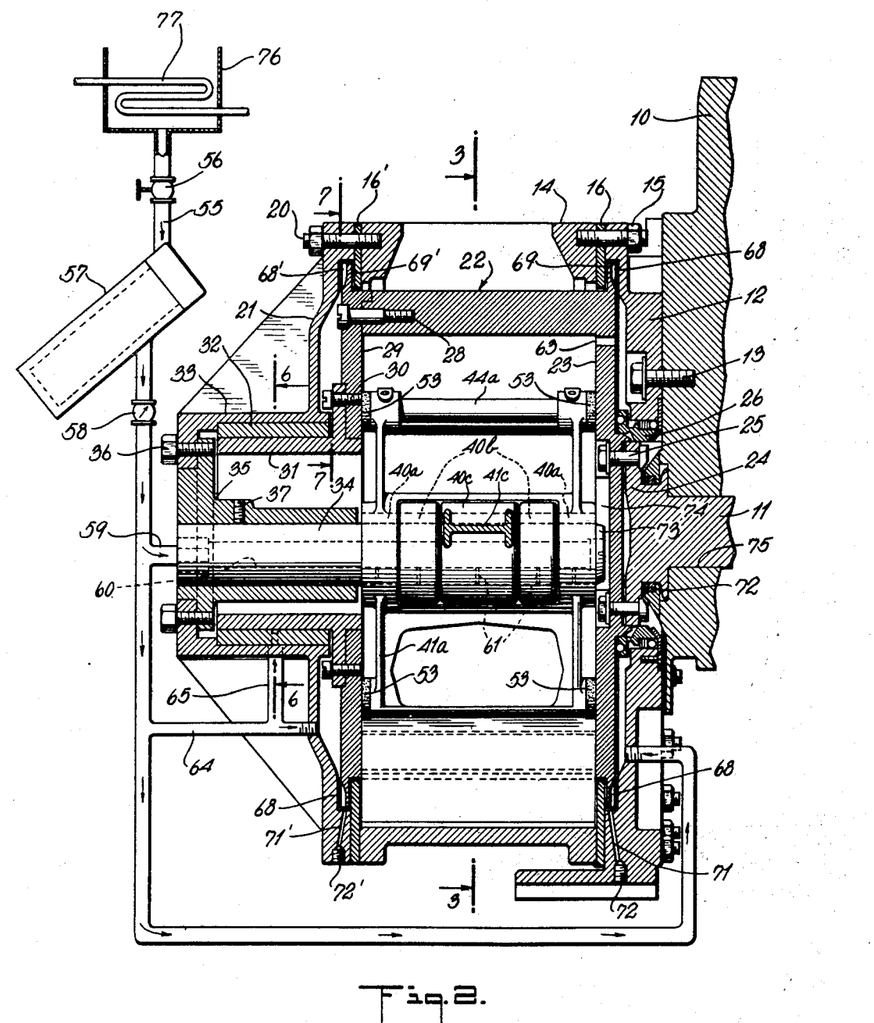
Fig. 2 is a side sectional elevation of the compressor-motor apparatus taken on the line 2—2 of Fig. 1.
Figure 8:
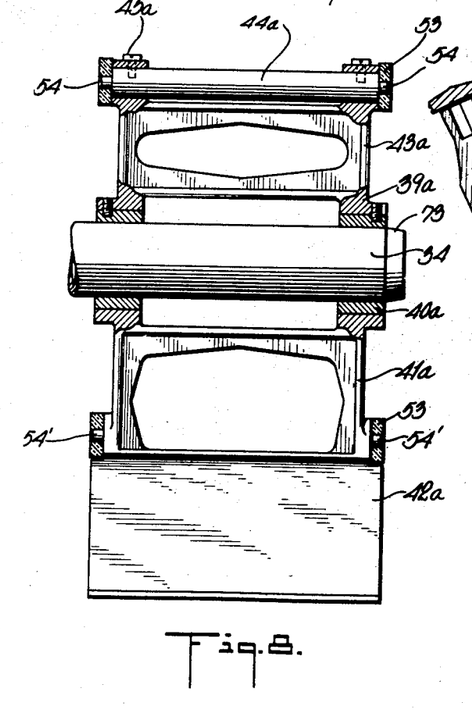
Figs. 8, 9 and 10 are respectively separate elevations of the three vane units of the apparatus.
Figure 9:
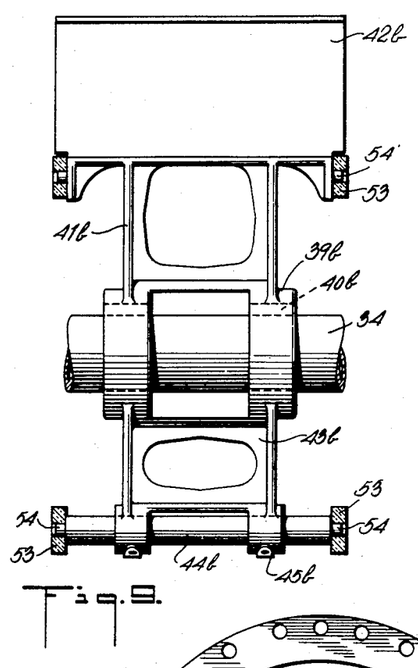
Figure 10:
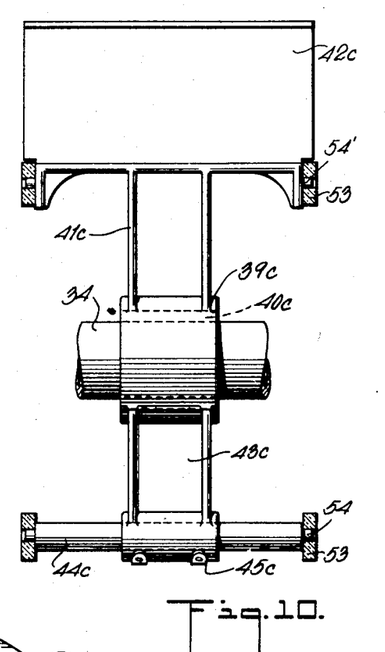

Rotatable about the vane-carrying shaft are vane units which are indicated generally by the reference characters 38a, 38b and 38c respectively. The vane unit 38a (see Fig. 8) is provided with a hub 39a through which the shaft 34 passes, anti-friction bushing means 40a being provided between the shaft 34 and the hub. Integral with the hub 39a and extending therefrom is the vane-carrying arm 41a from the end of which extends the plate-like vane member 42a. On the opposite side of the hub from the vane-carrying arm 41a is a counterweight carrying arm 43a the end of which provides a journal for the counterweight bar which can be maintained in position as by set screws 45a. The vane units 38b and 38c are shown in Figs. 9 and 10 respectively, and the parts have been indicated by like reference characters except for the employment of the letters $b$ and $c$ associated with the reference characters. As shown in Fig. 2 the bearing means for the vane units fit together on shaft 34 for rotation of the vane units in the same axial position relative to the shaft 34.

The vanes 42a, 42b and 42c extend through the rotor between the rotor segments 27 in slidable relation therewith and, in order to provide a sealing means which permits a certain amount of oscillation of the vanes relative to the rotor wall, the ends of the segments 27 have cylindrical recesses 46 therein into which are fitted for slidable rotation semi-cylindrical pivot blocks 47, the plane surfaces of which are in sliding engagement with the surfaces of the vanes 42a, 42b and 42c. The vanes 42a, 42b and 42c extend to close proximity with the internal cylindrical surface 17 of the confining means with very close clearance and are preferably provided with shoes 48a, 48b and 48c at the end that can be retracted into grooves 49 in the surface of the rotor between the segments. The bearing means for the vane units prevents centrifugal force from urging the ends of the vanes against the internal cylindrical surface 17. The lateral dimensions of the vanes 42a, 42b and 42c are such that the vanes provide a barrier across the crescent-shaped chamber between the periphery of the rotor and the confining means at all positions of the vanes relative to the chamber between the inlet and outlet ports. The surface 17 between the inlet and outlet ports is of at least sufficient extent so that a completely closed chamber will be provided between two vanes in the region of the surface 17.

It is usually desired to provide a channel 50 in the port ring 14 that constitutes a continuation or extension of the inlet port, so as to facilitate sweeping the vapor into the crescent-shaped chamber between the rotor and the port ring. A similar channel 52, but of lesser extent, is provided at the outlet port. The extent of the channel 52 determines the degree to which the vapor is compressed prior to its release.

For maintaining the vane units in proper axial position there are guide members 53 which are button-like and are held in position by the pins 54 and 54'. The pins 54 are conveniently formed at the ends of the counterweight bars 44a, 44b and 44c. The pins 54' are integral with vane-carrying arms 41a, 41b and 41c and preferably are spaced from the axis of the shaft by a distance corresponding to the distance by which pins 54 are spaced from the axis of shaft 34. The guide members 53 are disposed so as to be immediately proximate to the inner surface of the end walls 23 and 29 of the rotor for actual or virtual contact therewith. In either event, the relationship is referred to herein as sliding contact between the guide members and the inner surface of the end walls of the rotor.

By providing integral with the vane units guide members which present a surface for sliding contact that is several times the width of the edges of the vanes 42a, 42b and 42c, small clearances can be maintained between the vanes and the confining surfaces provided by end walls 23 and 29 and by sealing rings 16 and 16' without imposing frictional wear on the edges of the vanes. Thus when, as shown, the inner surfaces of the sealing rings 16 and 16' are in alignment with the inner surfaces of edges of the vanes and confining means. The guide members present a sliding contact surface which ordinarily is about one inch in width in the direction of the relative motion between the member and the part in sliding contact therewith and which preferably is at least ¾ inch in width. It is apparent that the guide members provide guide means radially spaced from the vane unit bearings and from shaft 34 for axially confining the vane units. The shape and number of the guide members may be varied and the surface presented by a part integral with the rotor, or otherwise, for sliding contact with the guide members may be varied. It is desirable, however, that each of the vane units be guided independently of the others as in the embodiment shown. The guide members generally are composed of material that is different from the material of the surfaces in sliding contact therewith, the requirements being resistance to wearing rather than strength. In the ordinary case the end walls of the rotor are made of metal formulated so as to have high strength. In such case the guide members can advantageously be composed of a suitable bearing metal, for example. When, as in the illustrative embodiment of the invention that is described herein, the guide members are lubricated by means of water, it is preferable to employ for the guiding surface of the guide members a plastic material such as the plastic material described hereinbelow for use in the vane unit and rotor bearings, namely, a plastic having a phenol-aldehyde resin as a base and containing asbestiform mineral fiber and graphite.

The lubricating means for lubricating the vane unit bearings and the rotor journal bearing is a feature of this invention. In the embodiment shown, these bearings are lubricated by means of water. The water used for lubrication is fed in by the line 55 which is controlled by valve 56 and which preferably contains a fine mesh strainer 57 and a flow indicator 58. The bearings for the vane units are fed by the branch line 59 which directs water from line 55 to the hollow interior 60 of the vane carrying shaft 34 which communicates with the radial passages 61 leading to each of the vane unit bearings. The arcuate channels 62 at the outer ends of the passages 61 facilitate the distribution of a substantial amount of water to provide lubrication at the vane unit bearings.

The vane unit bearings are arranged so that the water fed into the bearings to act as a lubricant escapes therefrom and becomes discharged into the interior of the rotor. While the water remains on the interior of the rotor it effectively acts as a lubricant between the guide members 53 and the inner surface of the end walls of the rotor as well as between the pivot blocks 47 and the vanes 42a, 42b and 42c. Adjacent the inner wall of the rotor segments 27 are passages 63 which constitute means for directing the water to the region outside of the rotor. The water eventually escapes from the apparatus as will be described below in connection with the construction and operation of the sealing means.

Figure 6:
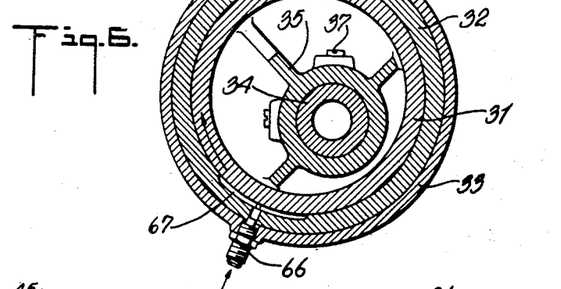
Fig. 6 is a section taken on the line 6—6 of Fig. 2 showing one of the rotor bearings and the means for holding the shaft for the vane units.

For lubricating the rotor journal bearing, water is taken from line 55 by branch lines 64 and 65, the latter line being tapped through bushing 32 by connections 66 (Fig. 6) to the arcuate passage 67 in the face of the bushing. Water escaping from the journal bearing is discharged from the apparatus as will be described in connection with the sealing means.

Figure 7:
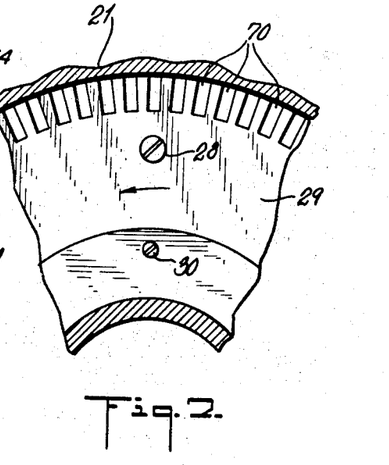
Fig. 7 is a front elevation detail, partly in section, taken on the line 7—7 of Fig. 2.

The sealing means for effecting a vapor seal between the rotor and the confining means is provided by the outwardly extending recess 68 provided by seal plate 16 and the outwardly extending recess 68' provided by the sealing plate 16'. Carried by the rotor and integrally therewith, is the flange 69 which penetrates into recess 68 and, on the opposite side, flange 69' which penetrates into recess 68'. The flange 69' is carried upon the rotor end wall 29, and, as shown in Fig. 7, one side of the flange has notches 70 cut therein leaving fin-like projections along the edge of the flange that penetrate into the recess 68'. Similar notches are cut out of the flange 69. The notches provide impeller means for causing any liquid in the recesses 68 and 68' to be thrust along by the movement of the flanges 69 and 69' thereby acquiring such centrifugal force as to maintain the recesses 68 and 68' filled with water regardless of the position of the compressor.

Water escaping from the vane unit bearings and thence to the exterior of the rotor tends to flow outwardly into the recess 68, while water escaping from the rotor journal bearing tends to flow outwardly into the recess 68' thereby providing water for maintaining the liquid seal. It is preferable for the purpose of providing an assured source of liquid for the sealing means to tap the branch line 64 directly through the front cover plate 21 so as to supply the recess 68, and to tap a continuation of the line 55 directly through the back cover plate 12 as shown. Preferably the bottom portion of recesses 68 and 68' are provided with drain passages 71 and 71' which can be plugged by plugs 72 and 72' during normal operation of the apparatus.

During operation of the apparatus the water fed into the recesses 68 and 68' gradually flows into the chamber between the rotor and the confining means and escapes as a mist with the compressed vapor.

By lubricating the bearings for the vane units and the rotor journal bearing with water, which, of course, is the condensate of the vapor being handled by the apparatus, the entire apparatus is simplified and one is able to avoid danger of contamination of the water vapor being handled by oil or other similar lubricant. If oil or other lubricant were used it would be necessary, in order to avoid contamination of the water vapor being handled by the apparatus, to provide a number of lubricant seals, about ten to twelve, and such seals together with conduits for directing lubricant to the bearings would add greatly to the size, complexity and cost of the equipment. Moreover, there would be constant danger that one or more of the seals, due to wear, would become defective with consequent contamination of the water vapor that is compressed by the apparatus.

Somewhat more generally according to this invention, bearing parts of the compressor-motor apparatus are lubricated with liquid which is compatible with the gas or vapor being handled by the apparatus and which preferably is the liquid phase of the gas or vapor handled by the apparatus. Preferably the liquid used as lubricant is non-corrosive to the parts of the apparatus with which it is brought into contact and has a viscosity during operation of the apparatus which ranges from that of water to that of an oil having an S. A. E. viscosity of about 30. When such a lubricant is used, the lubricant may, as in the device shown, come into contact with the gases or vapors being handled by the apparatus and may be partially vaporized, the resulting vapors being commingled with the gas or vapor being handled by the apparatus.

When a liquid is used in the manner aforesaid as a lubricant for bearing parts of the apparatus or to provide a liquid seal, the liquid serves a further function, namely, that of cooling the working parts of the apparatus. In the apparatus shown, and illustrated in connection with the compression of steam, water being used to lubricate the bearings and provide a liquid seal between the rotor and the confining means, the working parts of the apparatus operate at substantially the boiling point of water. It is desirable that the liquid be flowed through the apparatus at the rate of at least ¼ gallon per minute and preferably at the rate of at least ¾ gallon per minute for apparatus capable of handling ten pounds of vapor per minute when the apparatus is used either as a compressor or as a motor.

In employing water as lubricant for compressor-motor apparatus used for handling water vapor as in the typical operation described, the water is preferably heated to approximately its boiling point before being introduced into the apparatus. Thus when the apparatus is part of a vapor-compression distillation unit used for recovering pure water, a part of the water distillate at substantially its boiling point may be removed from the condenser and taken directly to the compressor-motor apparatus for use as a lubricant. If some other source of water as lubricant is used, some suitable means for heating the water prior to directing it into the compressor-motor apparatus may be employed so that the water will be heated to substantially its boiling point or to at least about 200° F. For example, the water may be heated in the reservoir 76 by some heating device such as heating coil 77 through which some heating medium such as steam or hot exhaust gases may be passed. At its boiling point water has a much lower viscosity (about .284 centipoise at 212° F.) than it does at ordinary temperatures (about .981 centipoise at 70° F.). Notwithstanding the low viscosity of the water at elevated temperatures, the water has been found to provide satisfactory lubrication for the apparatus of this invention.

In using liquids other than water as lubricant as herein described, such liquids as is the case with water, operate at relatively high temperatures when the apparatus is used at elevated temperature since the liquid becomes heated to approximately the operating temperature of the apparatus. For this reason, the liquid used should be one that has a boiling point not higher than the operating temperature of the parts of the apparatus with which the liquid comes into contact. It is preferable, however, that the liquid used as lubricant be introduced into the apparatus at approximately the normal operating temperature of the apparatus, which ordinarily is approximately the boiling point of the liquid used as lubricant.

In the operating of the compressor-motor apparatus of this invention with means for supplying water as a lubricant for the bearings, it has been found, as stated above, the ordinary bearing metals are inadequate. When, for example, the compressor-motor apparatus is used as a compressor for steam where both the lubricant (water) and the parts to be lubricated are maintained at a temperature which is substantially the boiling point of water, experiments have shown that most materials, when subjected to test for bearing use under such conditions, are inadequate for the purpose. I have found that by employment of certain combinations of materials for the bearing surfaces of the relatively movable bearing members, satisfactory operation under the conditions referred to can be obtained. The preferred combination consists in employing nitrided Nitralloy as the bearing surface presented by one of the bearing members and employing as the bearing surface presented by the other bearing member a rigid material having synthetic phenol aldehyde resin as a base, and containing asbestiform mineral fiber and graphite. Nitralloy is an alloy steel which contains in addition to iron, about 0.5% to 1.5% of chromium, molybdenum and aluminum.

By reference to nitrided Nitralloy herein and in the claims, the reference is to Nitralloy which has been subjected to ammonia gas at a temperature of the order of 1000° F. to increase the hardness and wear-resistance of the steel by the development of nitrides therein. While nitrided Nitralloy is a known material, its use in a water-lubricated bearing in operative combination with the bearing surface of another bearing member having synthetic phenol-aldehyde resin as a base and containing asbestiform mineral fiber and graphite, affords a new bearing which is capable of use under conditions that cause excessively rapid deterioration of bearings of the kinds heretofore employed.

Another suitable bearing which I have found to be suitable for withstanding the severe conditions mentioned above consists in the combination of a bearing member presenting a bearing surface having a synthetic phenol-aldehyde resin as a base and containing asbestiform mineral fiber and graphite with a relatively movable bearing member presenting a bearing surface consisting of high silicon Monel metal. Monel metal is a substantially non-ferrous alloy containing 60% to 70% nickel, 25% to 35% copper, 1% to 3% iron, 0.25% to 2% manganese, 0.02% to 1.5% silicon, and 0.3% to 0.5% carbon. By reference herein and in the claims to high silicon Monel metal, the reference is to Monel metal which contains about 4.0% or more of silicon. Other metals having a Brinell hardness above 200 and preferably above 300 that are not corroded by the action of water at its boiling point and by steam may likewise be employed in combination with the non-metallic part of the bearing although the two alloys specifically mentioned are preferred.

In the bearing member which presents a bearing surface having a synthetic phenol-aldehyde resin as a base and containing asbestiform mineral fiber and graphite, the graphite acts as a lubricant. Another solid lubricant which may be employed in lieu of or in addition to graphite is mica flakes. However, the employment of graphite as the major proportion of the solid lubricant is preferable. While asbestiform mineral fiber is preferred, other mineral fibers such as rock wool or glass fibers may be employed. Another resinous material that may be employed is a hard synthetic resin of the melamine type, although resins of phenol-aldehyde type which are hard and highly resistant to boiling water are preferred. A resin or a metal that withstands boiling water for as long as one week without apparent change is regarded as having high resistance to boiling water.

Referring more specifically to the embodiment of this invention shown in the drawings and described hereinabove, the shaft 34 preferably is composed of nitrided Nitralloy and the bushings 40a, 40b and 40c may be composed essentially of synthetic phenol-aldehyde resin, asbestiform mineral fiber and graphite. Alternatively the shaft 34 may be composed of high silicon Monel metal. Similarly, the journal bearing 31 may be composed of nitrided Nitralloy or high silicon Monel metal and the journal bearing bushing 32 may be composed of the synthetic phenol-aldehyde resin containing asbestiform mineral fiber and graphite.

While the novel bearing above described is of particular advantage when embodied in compressor-motor apparatus of the character described, it is apparent that it is of general advantage and utility for use under special severe conditions such as those encountered when a bearing is operated at relatively high temperature using a liquid such as water as a lubricant.

In operation of the apparatus as a compressor for the compression of steam, the rotor may be rotated in a counterclockwise direction (Fig. 3) by the power shaft 11. The rotation of the rotor causes the vanes to be rotated therewith thereby sweeping the vapor into the crescent shaped chamber which, in the region of the inlet 18, becomes of increasing cross-sectional dimensions in the direction of rotation of the rotor. The vapor then becomes entrapped between the vanes in the region between the inlet and outlet ports, and since the crescent shaped chamber becomes of decreased cross section as it approaches the exhaust port 19, the vapor is compressed and, when it reaches the exhaust port, will have become compresed to the desired pressure to be maintained at the exhaust port. During operation clean water, which ordinarily is distilled water when the compressor constitutes part of a vapor-compression distillation unit for the distillation of water, is supplied to the vane unit and rotor bearings and to the sealing channel. For a compressor handling about 280 cubic feet per minute of steam at approximately atmospheric pressure, the water may, for example, be fed at the rate of about one-half gallon per minute as indicated by the flow meter 58. The water provides lubrication for the movable parts with the exception of the power shaft 11, and provides liquid for the sealing channel. It is to be noted that lubrication is afforded while avoiding any possible source of contamination of the steam with vapor or entrained liquid derived from lubricating oil. This is of considerable practical importance, when, for example, the steam is subsequently condensed to provide distillate to be used as drinking water.

It is apparent that if steam under elevated pressure, e. g., as supplied by a boiler, were to be introduced at the port 19 (which in such case would become the inlet port), the port 18 being maintained in communication with a region of lower pressure, the rotor and vanes would be rotated in a clockwise direction and the shaft 11 would become a power shaft from which power could be taken off.

The compressor-motor apparatus of the character herein described is of particular utility and advantage when it is used for handling vapor or gases which are compatible with the liquid used for lubricating the bearings, and preferably, when the apparatus is used to handle a vapor, the liquid used for lubrication is the liquid phase of the material in vapor form that is handled by the apparatus. In this connection it may be mentioned that when the apparatus is used for handling air, water can satisfactorily be used for lubrication, sealing and cooling of the apparatus. If desired a liquid-vapor separator can be used to separate any entrained droplets of the liquid used for lubrication, sealing or cooling purposes from the gas or vapor discharged from the apparatus, but ordinarily this is not necessary or desirable.

While this invention has been described in connection with certain specific embodiments thereof, it is to be understood that this has been done merely for the purpose of illustration and that the scope of this invention is to be governed by the language of the following claims.

I claim:

1. A bearing comprising in combination two relatively movable bearing members presenting bearing surfaces therebetween, and means for supplying water as lubricant to said bearing surfaces between said members, the bearing surface presented by one of said bearing members being presented by a body of substantial thickness having as a base a synthetic resin highly resistant to boiling water and selected from the group consisting of phenol-aldehyde and melamine resins and containing mineral fiber and a solid lubricant, and the bearing surface presented by the other of said bearing members being presented by a body of substantial thickness consisting of a metal having a Brinell hardness of at least 200 and having high resistance to corrosion in contact with water at its boiling point.

2. A bearing according to claim 1 wherein the bearing surface consisting of a metal having a Brinell hardness of at least 200 and having high resistance to corrosion in contact with water at its boiling point is presented by the inner member of said bearing.

3. A bearing according to claim 1 wherein said means for supplying water as lubricant for said bearing members includes passage means in one of said members which passage means is connected to a supply of water as lubricant and which passage means communicates with an aperture in the bearing surface of the bearing member comprising said passage means.

4. A bearing according to claim 1 which comprises means for heating water supplied as lubricant for said bearing by said lubricant supply means.

5. A bearing according to claim 1 wherein said mineral fiber comprises asbestiform mineral fiber.

6. A bearing comprising in combination two relatively movable bearing members presenting bearing surfaces therebetween, means for supplying water as lubricant to said bearing surfaces between said members and means for heating the water supplied to said bearing surfaces, the bearing surface presented by one of said bearing members being presented by a body of substantial thickness having as a base a phenol-aldehyde synthetic resin and containing asbestiform mineral fiber and graphite, and the bearing surface presented by the other of said bearing members being presented by a body of substantial thickness consisting of a metal having a Brinell hardness of at least 200 and having high resistance to corrosion in contact with water at its boiling point.

7. A bearing comprising in combination two relatively movable bearing members presenting bearing surfaces therebetween and means for supplying water as lubricant to said bearing surfaces between said members, the bearing surface presented by one of said members being presented by a body of substantial thickness consisting of high silicon Monel metal and the bearing surface presented by the other of said bearing members being presented by a body of substantial thickness having as a base phenol-aldehyde synthetic resin and containing asbestiform mineral fiber and graphite.

8. A bearing comprising in combination two relatively movable bearing members presenting bearing surfaces therebetween and means for supplying water as lubricant to said bearing surfaces between said members, the bearing surface presented by one of said members being presented by a body of substantial thickness consisting of nitrided Nitralloy and the bearing surface presented by the other of said bearing members being presented by a body of substantial thickness having as a base phenol-aldehyde synthetic resin and containing asbestiform mineral fiber and graphite.

9. A bearing comprising in combination two relatively movable bearing members presenting bearing surfaces therebetween, the bearing surface presented by one of said bearing members being presented by a body of substantial thickness having as a base a synthetic resin highly resistant to boiling water and selected from the group consisting of phenol-aldehyde and melamine resins and containing mineral fiber and a solid lubricant, and the bearing surface presented by the other of said bearing members being presented by a body of substantial thickness consisting of a metal having a Brinell hardness of at least 200 and having high resistance to corrosion in contact with water at its boiling point.

10. A bearing according to claim 9 which comprises lubricant supply means for supplying lubricant to said bearing and means for heating lubricant supplied to said bearing by said lubricant supply means.

11. A bearing according to claim 9 wherein said mineral fiber consists predominantly of asbestiform mineral fiber and wherein said solid lubricant consists predominantly of graphite.

ALLEN LATHAM, Jr.

REFERENCES CITED

The following references are of record in the file of this patent:

UNITED STATES PATENTS

| Number | Name | Date |
| --- | --- | --- |
| 1,929,836 | Brown | Oct. 10, 1933 |
| 2,208,975 | Hait | July 23, 1940 |
| 1,557,767 | Oliver | Oct. 20, 1925 |
| 1,054,265 | Baekeland | Feb. 25, 1913 |
| 2,338,480 | Auxier | Jan. 4, 1944 |
| 2,059,856 | Eastman | Nov. 3, 1936 |

FOREIGN PATENTS

| Number | Country | Date |
| --- | --- | --- |
| 326,705 | Italy | June 13, 1935 |